United States Patent
Cao et al.

(10) Patent No.: US 11,153,042 B2
(45) Date of Patent: Oct. 19, 2021

(54) EFFICIENT CONTROL SIGNALING METHOD AND SYSTEM

(71) Applicant: ZTE Corporation, Guangdong (CN)

(72) Inventors: Wei Cao, Guangdong (CN); Li Tian, Guangdong (CN); Jun Xu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/882,311

(22) Filed: May 22, 2020

(65) Prior Publication Data
US 2020/0287669 A1 Sep. 10, 2020

Related U.S. Application Data

(63) Continuation of application No. PCT/CN2017/112355, filed on Nov. 22, 2017.

(51) Int. Cl.
*H04L 1/18* (2006.01)
*H04L 1/00* (2006.01)

(52) U.S. Cl.
CPC .......... *H04L 1/1896* (2013.01); *H04L 1/0003* (2013.01); *H04L 1/0007* (2013.01); *H04L 1/1812* (2013.01)

(58) Field of Classification Search
CPC ... H04L 1/1896; H04L 1/0003; H04L 1/0007; H04L 1/1812; H04L 1/003; H04L 1/0025;
(Continued)

(56) References Cited

U.S. PATENT DOCUMENTS

2010/0316026 A1   12/2010   Lee et al.
2012/0044892 A1   2/2012    Guan et al.
(Continued)

FOREIGN PATENT DOCUMENTS

CN   102754373   10/2012
CN   103493417   1/2014
(Continued)

OTHER PUBLICATIONS

International Search Report and Written Opinion dated Jun. 28, 2018 for International Application No. PCT/CN2017/112355, filed on Nov. 22, 2017 (8 pages).
(Continued)

*Primary Examiner* — Hassan Kizou
*Assistant Examiner* — Abdullahi Ahmed
(74) *Attorney, Agent, or Firm* — Perkins Coie LLP

(57) ABSTRACT

Reducing control signaling is an effective technique for increasing resource efficiency when supporting a massive number of connections in an Internet of Things framework. In the presence of sporadic and small data packets, the use of control signaling must be optimized to not overwhelm network resources. In some embodiments, a bit map in a control signaling packet may indicate if certain information elements that correspond to configuration parameters are present or absent. When they are absent, predetermined values for the corresponding configuration parameters may be used, whereas when they are present, predefined values from a set of predefined values may be used. In other embodiments, the predetermined values may be periodically updated.

20 Claims, 5 Drawing Sheets

(58) Field of Classification Search
CPC ....... H04L 1/0009; H04L 1/0031; H04L 1/08; H04L 1/1816; H04L 1/1819; H04L 1/1614

See application file for complete search history.

(56) References Cited

U.S. PATENT DOCUMENTS

| | | | |
|---|---|---|---|
| 2014/0071918 A1 | 3/2014 | Park et al. | |
| 2014/0198730 A1 | 7/2014 | Khoshnevis et al. | |
| 2015/0063231 A1* | 3/2015 | Seo | H04W 72/042 370/329 |
| 2015/0155966 A1 | 6/2015 | Zeng et al. | |
| 2016/0105489 A1* | 4/2016 | Llorca | G06F 9/50 709/226 |
| 2017/0013453 A1 | 1/2017 | Lee et al. | |
| 2018/0124633 A1* | 5/2018 | Hwang | H04W 28/02 |
| 2018/0343583 A1* | 11/2018 | Shan | H04L 1/1864 |
| 2018/0376390 A1* | 12/2018 | Gemelos | H04W 36/0005 |
| 2019/0044649 A1* | 2/2019 | Kim | H04L 1/00 |
| 2019/0305839 A1* | 10/2019 | Zhang | H04B 7/0456 |
| 2019/0387484 A1* | 12/2019 | Ioffe | H04W 4/70 |
| 2020/0053795 A1* | 2/2020 | Lin | H04W 68/02 |
| 2021/0160814 A1* | 5/2021 | Wang | H04W 68/005 |
| 2021/0227472 A1* | 7/2021 | Liu | H04W 72/042 |

FOREIGN PATENT DOCUMENTS

| | | |
|---|---|---|
| CN | 105451211 | 3/2016 |
| JP | 2014-533910 A | 12/2014 |
| JP | 2016-225873 A | 12/2016 |
| KR | 10-2014-0090252 A | 7/2014 |
| KR | 10-2014-0123491 A | 10/2014 |
| WO | 2013/074722 A1 | 5/2013 |
| WO | 2016/195547 A1 | 12/2016 |
| WO | 2017/118253 A1 | 7/2017 |
| WO | 2017/136021 A1 | 8/2017 |
| WO | 2017/167944 A1 | 10/2017 |
| WO | 2017/189038 A1 | 11/2017 |

OTHER PUBLICATIONS

Sun, G., et al., "Dynamic Resource Reservation for Ultra-low Latency IoT Air-Interface Slice," KSII Transactions on Internet and Information Systems, 11(7):3309-3328, Jul. 2017.

Samsung, "Power saving for paging and connected-mode DRX for NB-IoT," 3GPP TSG RAN WG1 Meeting #89, Hangzhou, China, R1-1709285, May 2017.

Mediatek Inc., "Discussion on DCI formats," 3GPP TSG RAN WG1 Meeting #90bis, Prague, Czech Republic, R1-1718325, Oct. 2017.

LG Electronics, "Discussion on configurability of DCI contents," 3GPP TSG RAN WG1 Meeting #89, Hangzhou, China, R1-1707633, May 2017.

Extended European Search Report for European Patent Application No. 17933178.0, dated Nov. 18, 2020.

Office Action for Korean Patent Application No. 10-2020-7018052, dated Jul. 30, 2021, with English summary.

Office Action for Japanese Patent Application No. 2020-528268, dated Aug. 3, 2021, with English summary.

LG Electronics, "Further discussion on DCI formats," 3GPP TSG RAN WG1 Meeting 90bis, Prague, Czech Republic, R1-1717954, Oct. 2017 (6 pages).

* cited by examiner

EFFICIENT CONTROL SIGNALING METHOD AND SYSTEM

CROSS REFERENCE TO RELATED APPLICATIONS

This patent document is a continuation of and claims benefit of priority to International Patent Application No. PCT/CN2017/112355, filed on Nov. 22, 2017. The entire content of the before-mentioned patent application is incorporated by reference as part of the disclosure of this application.

TECHNICAL FIELD

This document is directed generally to wireless communications.

BACKGROUND

Mobile telecommunication technologies are moving the world toward an increasingly connected and networked society, referred to as the Internet of Things (IoT). In comparison with the existing wireless networks, next generation systems and wireless communication techniques will need to support a much wider range of use-case characteristics and provide more efficient use of network resources.

SUMMARY

This document relates to methods, systems, and devices for efficient control signaling in wireless communication networks that support a massive number of connections, thereby more efficiently utilizing network resources.

In one exemplary aspect, a wireless communication method is disclosed. The method comprises receiving a control signaling packet, determining, based on a bit map in the control signaling packet, whether one or more information elements are present in the control signaling packet, wherein each of the one or more information elements corresponds to a configuration parameter of a set of configuration parameters, and wherein the set of configuration parameters includes at least one of a modulation and coding scheme (MCS), a transmission block (TB) size, a redundancy version (RV), and a hybrid automatic repeat request (HARQ) process identification (PID). Upon determining an information element of the one or more information elements is absent in the control signaling packet, using a predetermined value for the configuration parameter corresponding to the absent information element, wherein the predetermined value is determined by a communication node, and upon determining an information element of the one or more information elements is present in the control signaling packet, using a predefined value from a set of predefined values for the configuration parameter corresponding to the present information element.

In another exemplary aspect, another wireless communication method is disclosed. The method comprises determining whether each predetermined value for each configuration parameter of a set of configuration parameters supports a current transmission mode, wherein the set of configuration parameters includes at least one of a modulation and coding scheme, a transmission block size, a redundancy version, and a hybrid automatic repeat request (HARQ) process identification (PID). Upon determining the current transmission mode is not supported, including at least one information element in a control signaling packet, and modifying a bit map in the control signaling packet, and subsequently, transmitting the control signaling packet.

In yet another exemplary aspect, a wireless communication apparatus (e.g., a mobile station or UE) is disclosed. The wireless communication apparatus comprises a processor operable to execute instructions to cause the mobile station to receive a control signaling packet, determine, based on a bit map in the control signaling packet, whether one or more information elements are present in the control signaling packet, wherein each of the one or more information elements corresponds to a configuration parameter of a set of configuration parameters, and wherein the set of configuration parameters includes at least one of an MCS, a TB size, an RV, and a HARQ PID. Upon determining an information element of the one or more information elements is absent in the control signaling packet, the instructions further cause the mobile station to use a predetermined value for the configuration parameter corresponding to the absent information element, wherein the predetermined value is determined by a communication node, and upon determining an information element of the one or more information elements is present in the control signaling packet, the instructions further cause the mobile station to use a predefined value from a set of predefined values for the configuration parameter corresponding to the present information element.

In yet another exemplary aspect, a communication node (wireless base station) is disclosed. The communication node comprises a processor operable to execute instructions to cause the communication node to determine whether each predetermined value for each configuration parameter of a set of configuration parameters supports a current transmission mode, wherein the set of configuration parameters includes at least one of an MCS, a TB size, an RV, and a HARQ PID. Upon determining the current transmission mode is not supported, the instructions further cause the communication node to include at least one information element in a control signaling packet, and modify a bit map in the control signaling packet, and subsequently transmit the control signaling packet.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

With the development of Internet of Things (IoT), a huge number of sensor nodes equipped with wireless communication modules are intended to be served by cellular networks. In general, IoT traffic tends to be sporadic and with small data packet sizes, and exhibits quite a different traffic profile than legacy voice or data services. An active area of research in IoT communications is resource efficiency when supporting a massive number of connections. To support the sporadic and small packet size traffic profile from numerous sensor nodes, signaling overhead to configure parameters may occupy more resources than the data packets that are subsequently transmitted. Thus, control signaling over the control channel becomes a bottleneck that must be addressed.

Figure 1:
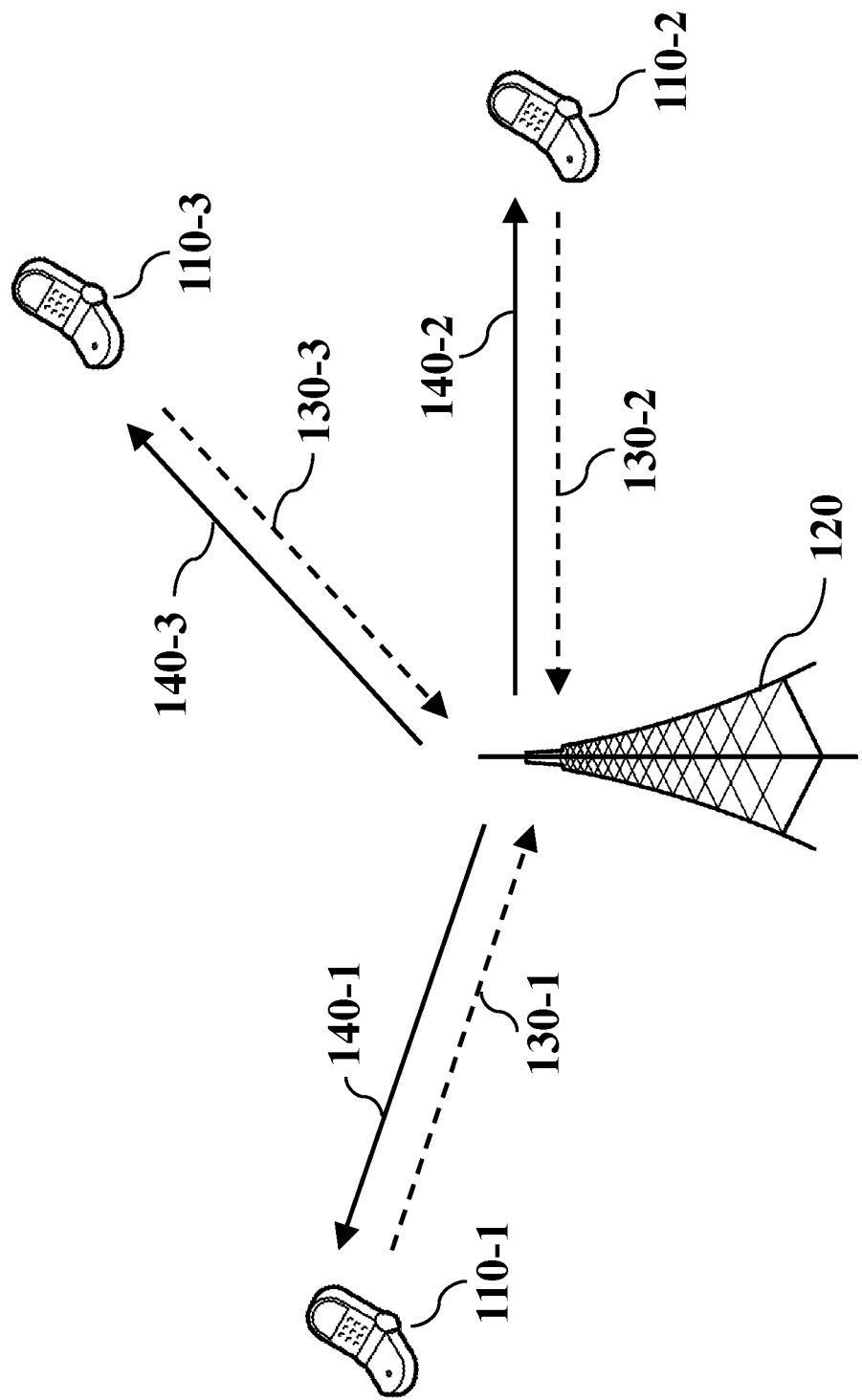
FIG. 1 shows an example of a base station (BS) and user equipment (UE) in wireless communication, in accordance with some embodiments of the presently disclosed technology.

FIG. 1 shows an example of a base station (BS) and UEs in wireless communication, in accordance with some embodiments of the presently disclosed technology. In an embodiment, the base station 120 transmits control signaling (140-1 to 140-3) to the respective UEs (110-1 to 110-3). The control signaling may contain configuration parameters for subsequent data transfers (130-1 to 130-3) by the UEs. The configuration parameters generally include MCS (modulation and coding schemes), TB (transmission block) size and RV (redundancy version), but are not limited to these parameters. Any configuration parameters that are used in the formatting or configuration of data packets may be transmitted, as information elements, as part of the control signaling.

In an example, the MCS, TB size and RV parameters are mandatory information elements in current Long Term Evolution (LTE) systems. To support legacy voice or data services in LTE systems, tens of MCS, tens of TB size and 4 RV are defined for UEs with various capabilities. In contrast, for IoT scenarios, a smaller set of parameters may be needed since the sensor capabilities are limited due to cost and power consumption restrictions. For example, the expected or required data rate that must be supported by the system can be used to determine what set of parameters are needed.

Regardless of the application, control signaling is typically used to configure subsequent data transfers, and embodiments of the presently disclosed technology minimize the amount of control signaling required, which is particularly beneficial when the data traffic profile is sporadic and comprises numerous small packets.

Embodiments of the presently disclosed technology disclose using the presence or absence of information elements in a control signaling packet to determine what values certain configuration parameters should be set to for subsequent data transfers. For example, upon determining an information element corresponding to one or more parameters is absent, the UE interprets the absence to indicate that predetermined values should be used for those one or more parameters. In contrast, upon determining an information element corresponding to one or more parameters is present, the UE will derive a value to use for those one or more parameters from data in the corresponding information element. In other embodiments of the presently disclosed technology, the predetermined values used by the UE are determined from a range of predetermined values, and may be updated periodically by the base station.

Figure 2A:
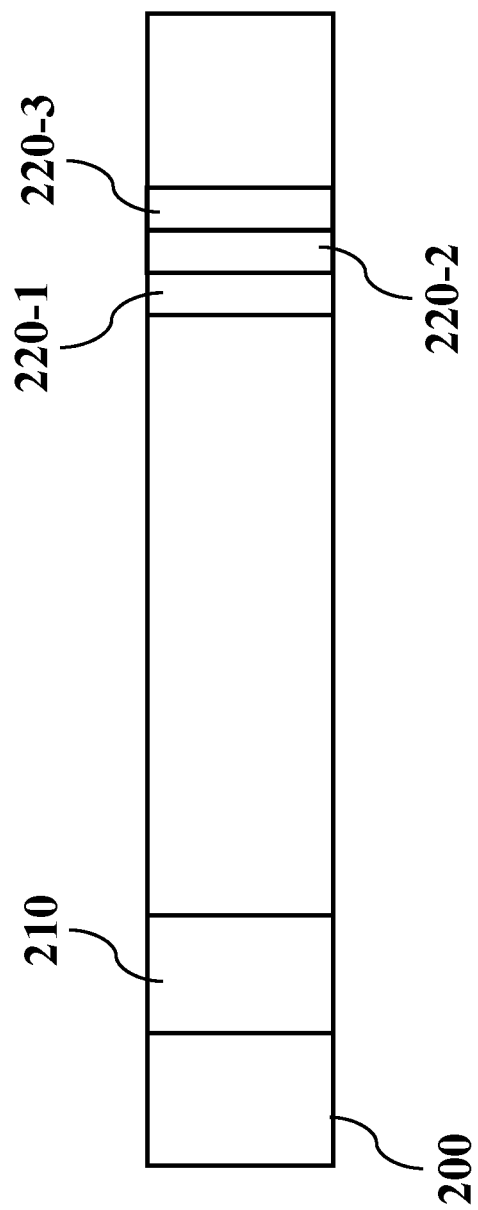
FIGS. 2A and 2B show examples of packets with a bit map and information elements, in accordance with some embodiments of the presently disclosed technology.
Figure 2B:
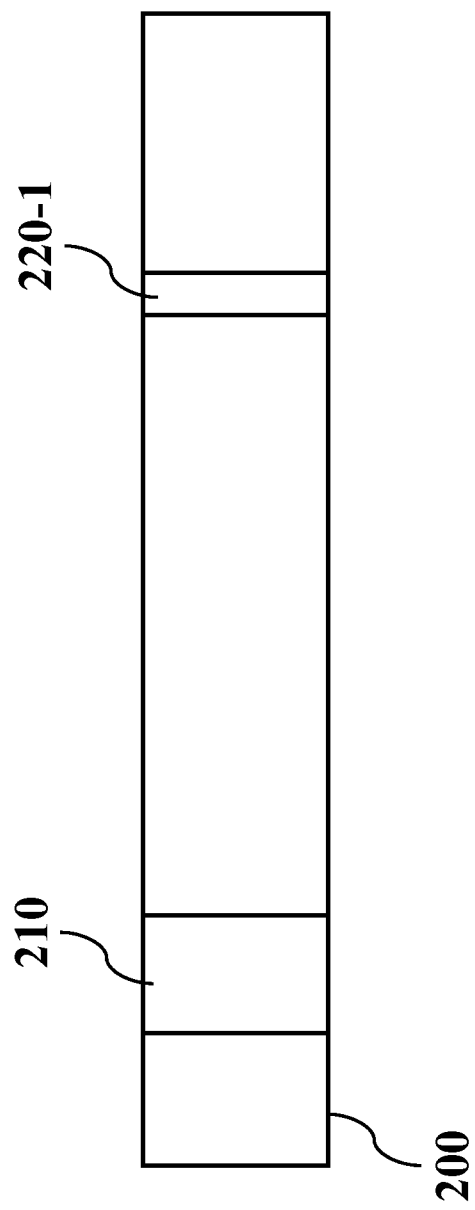

FIGS. 2A and 2B show examples of packets with a bit map and information elements, in accordance with some embodiments of the presently disclosed technology. In an embodiment, FIG. 2A shows a packet 200 comprising a bit map field 210 which encodes the presence or absence of information elements (220-1 to 220-3). In a simplified scenario, a bit map value of "111" in the bit map field 210 may indicate that the three information elements are present in the packet 200. As an example, the information elements (220-1 to 220-3) are interpreted as corresponding to the modulation and coding scheme (MCS), the transmission block (TB) size, and the redundancy version (RV). Upon receiving this packet from the base station, and based on data in the respective information elements, the UE will use predefined values for the corresponding configuration parameters. In an example, the MCS, TB size and RV parameters for subsequent data transmissions will be updated at the UE. In an embodiment, the predefined values may be stored as a configuration parameter table.

FIG. 2B shows a packet 200 comprising a bit map field 210 that, in an embodiment, encodes the presence of the MCS parameter in an information element 220-1, but the absence of the information elements for the TB size and RV parameters. In this scenario, the bit map value of "100" results in the use of the predefined value for the MCS based on the data in the information element 220-1. And the predetermined values of the TB size and RV are used by the UE since the corresponding information elements are absent in the control signaling packet.

In an embodiment, the predetermined values of the TB size and RV parameters that are currently being used by the UE are employed. In another embodiment, the predetermined value of the RV parameter depends on the value of the MCS parameter since it is assumed that the MCS parameter has a higher priority than the RV parameter.

Embodiments of the presently disclosed technology are not limited to the examples described herein. An information element may correspond to one or more configuration parameters, and its absence or presence will result in predetermined (e.g., values periodically received from the base station) or alternate (e.g., predefined values that are determined based on data in the information elements) values being used, respectively, for all of the one or more configuration parameters.

Similarly, a hierarchy may be established between parameters, with some parameters having a greater priority than other parameters. Upon determining that the information elements for parameters with lower priorities are absent, these lower priority parameters may be assigned predetermined values depending on the values that higher priority parameters have been assigned. The higher priority configuration parameters, in these scenarios, may have had their values assigned using predetermined values or by the data in the corresponding information element.

In some embodiments, predetermined values for parameters are typically fixed at the UE, but may be periodically updated by the base station based on the capabilities of the UEs in a wireless environment. For example, based on past, current or future wireless conditions (e.g. RSSI or SNR measurements) and/or the capabilities of the UEs, the base station may determine new predetermined values and transmit them to the UEs in periodic broadcast packets.

Example 1

In some IoT applications, environmental sensors periodically send measured data via small data packets to the base station. The data rate is generally low (e.g., less than 100 kilobits per second) and using QPSK modulation is typically enough to guarantee a robust reception performance. Furthermore, a 4-repetition technique is applied to combat path loss in extreme coverage (e.g., sensors in soil or basement).

The base station uses the following example small table of MCS, TB size and RV for the set of predefined values, with a nominal value set and two other options. In an embodiment, the nominal value set is the default set of predetermined values that may be used upon determining the corresponding informational elements are absent.

| Information Element Bitmap | Modulation Order | Transmission Block size Index | Redundancy Version |
| --- | --- | --- | --- |
| 000 (nominal) | 2 | 0 | [0 3 0 3] |
| 011 | 2 | 1 | [0 0 0 0] |
| 011 | 2 | 2 | [0 2 3 1] |

With regarding to the received control signaling packet, two possible cases are discussed. In the first case, the information element is absent, and values for the MCS, TB size and RV parameters are not explicitly indicated. Thus, the nominal value set is used by UE to transmit any subsequent data packets. The corresponding RV of 4-repetition is [0 3 0 3] so that each single repeated copy is self-decodable and IR (incremental redundancy) combining is possible between repeated copies.

In the second case, the information element is present, and the values for the MCS, TB size and RV parameters are explicitly indicated. The 3-bit bitmap enables the independent configuration of the parameters. Thus, the indicated value set should be used by UE to transmit subsequent data packets. The corresponding RV of 4-repetition is [0 0 0 0] or [0 2 3 1]. The former facilitates self-decodable repeated copies and chase combining (CC), whereas the latter enables incremental redundancy combining (better than CC) between repeated copies.

In another example, three configuration options are supported at the UE using a single bit, and both self-decodable and IR (incremental redundancy) combining are supported by the nominal value set. Furthermore, since small data packets and a low data rate are employed in this IoT application, the set of predefined values only has three possible configuration options. In general, the size of the set of predefined values may be based on the supported or required data rate.

Example 2

In some IoT applications, sensors with different data rates are deployed in the same cell. The base station should support a few MCS options to fulfill the requirements of data measurement reporting from various sensors. Both BPSK and QPSK modulations are supported in this example.

The base station uses following example small table of MCS, TB size and RV parameters for the set of predefined values, with a nominal value set and 6 other options.

| Information Element Bitmap | Modulation Order | Transmission Block size Index | Redundancy Version |
| --- | --- | --- | --- |
| 000 (nominal) | 2 | 0 | 0 |
| 110 | 1 | 1 | 0 |
| 111 | 1 | 1 | 3 |
| 110 | 1 | 2 | 0 |
| 111 | 2 | 2 | 3 |
| 110 | 2 | 3 | 0 |
| 111 | 2 | 3 | 3 |

As in the previous example (Example 1), two possible cases are discussed. In the first case, the information element is absent, which means values for the MCS, TB size and RV parameters are not explicitly indicated. Thus, a nominal value set should be used by UE to transmit its subsequent data packets. The predetermined modulation value is QPSK, which is determined by the base station, and based on the capabilities of the sensors and the wireless environment. With this option, 3-bit signaling overhead can be saved for each applicable UE. In the second, the information element is present, which means values for the MCS, TB size and RV parameters are explicitly indicated. As shown in the table above, each 3-bit bitmap can independently configure each of the configuration parameters to the values in the configuration table. Thus, the indicated value set should be used by UE to transmit its following data package.

Figure 3:
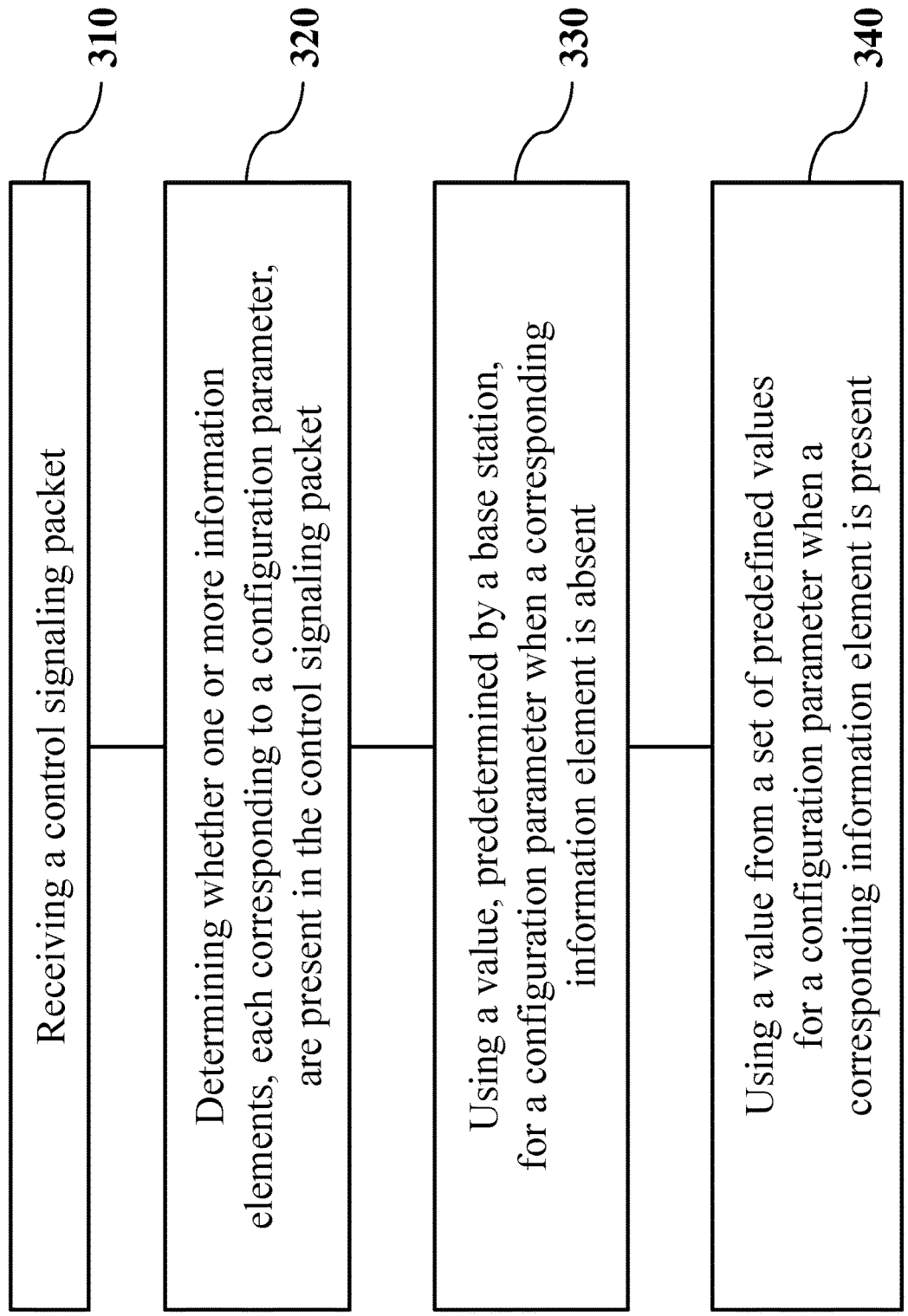
FIG. 3 shows an example of a wireless communication method carried out on a wireless communication apparatus, in accordance with some embodiments of the presently disclosed technology.

FIG. 3 shows an example of a wireless communication method that may be implemented at a wireless communication apparatus (a UE or a sensor), in accordance with some embodiments of the presently disclosed technology. The method begins at step 310, wherein the UE or sensor receives a control signaling packet from the base station.

At step 320, the UE parses the bit map field in the control signaling packet, and determines whether one or more information elements are present or absent in the control signaling packet. The bit map field may comprise other signaling structures, in addition to the indication of the information elements for configuring parameters for subsequent data packet transmissions. Furthermore, each information element may correspond to one or more configuration parameters.

In the context of FIG. 2A and FIG. 2B, an information element bit corresponds to a single configuration parameter. The embodiments described herein are not restricted to use specific parameters, or by any mapping between information elements and configuration parameters.

At step 330, predetermined values are used for one or more configuration parameters upon determining the corresponding information elements are absent. The predetermined values are typically determined by a communication node (or base station). In an embodiment, the predetermined values may be selected individually for each configuration parameter, or as a set for a group of configuration parameters. In another embodiment, the predetermined values used for certain configuration parameters (lower priority) may depend on values used for other configuration parameters (higher priority), irrespective of how the value of the high priority configuration parameter was determined.

For example, and in the context of Example 1 described above, if it is assumed that MCS has a higher priority than the RV, the predetermined value of RV is determined by the chosen value of MCS. If the MCS parameter is set to [0 or 1] (regardless of whether this MCS value is determined by using a predetermined value or an alternate value based on a corresponding information element), if the information element corresponding to the RV is not present in the control signaling packet, then its predetermined value is [0 3 0 3]. If MCS is chosen as something other than [0,1], and if the information element correspond to RV is not present in the message, then its predetermined value is [0 2 3 1]. In this example, the RV parameter has 2 predetermined values, and one of them is determined by the MCS parameter.

In yet another embodiment, the predetermined value may be chosen by a base station from a range of predetermined values, and may be periodically updated by the base station. Furthermore, a predetermined value may be chosen from at least part of all available values for each parameter. For example, the value of the MCS parameter may be in the range [0, 1 . . . , 31], and the predetermined value may be chosen from the range [0, 1, 2]. In an embodiment, the predetermined value is determined by the base station is based on the capabilities of a majority of the UEs. The base station then broadcasts this updated predetermined value to UEs in its coverage. The predetermined value can be changed periodically due to dynamic statistics of the wireless environment. Thus, the base station will periodically broadcast to update the predetermined value, and UEs receiving the broadcast will update to the latest predetermined value.

At step 340, predefined values from a set of predefined values are used for one or more configuration parameters upon determining the corresponding information elements is present. The predefined values for one or more configuration parameters are determined based on data in the corresponding information element. For example, the data can be an index of a table of MCS, TB size and RV parameters. In another example, the data can be values for one or more configuration parameters.

Figure 4:
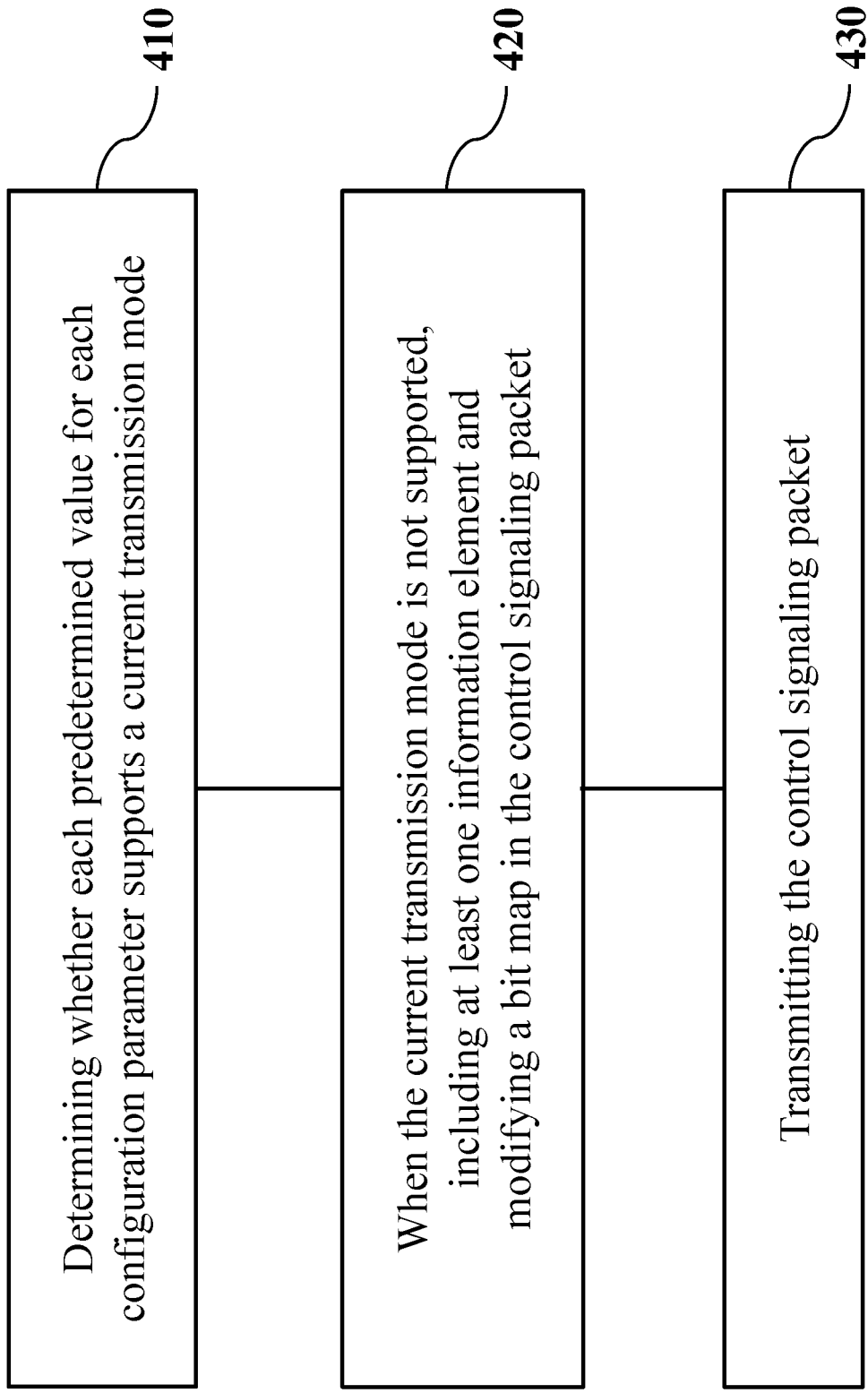
FIG. 4 shows an example of a wireless communication method for carried out on a communication node, in accordance with some embodiments of the presently disclosed technology.

FIG. 4 shows an example of a wireless communication method that may be implemented at a communication node (e.g., a base station), in accordance with some embodiments of the presently disclosed technology. The method begins at step 410, wherein the communication node determines whether the current predetermined values for each parameter of the configuration set can support the current transmission mode. In effect, are the UEs covered by the BS able to robustly receive data from the BS. If this is not the case, then the configuration parameters at the UEs must be updated to switch to a more appropriate transmission mode.

At step 420, and upon determining the current transmission mode is not supported, at least one information element is inserted into a control signaling packet, and the bit map field is modified or updated to indicate the present of that at least one information element. As previously described, each information element may correspond to one or more configuration parameters, and may comprise data that determines the predefined values at the UE.

At step 430, the base station transmits the control signaling packet to update the configuration parameters at each UE in its coverage. In some embodiments, the base station may additionally transmit periodic broadcast packets that update predetermined values based on evolving channel or communication conditions.

Figure 5:
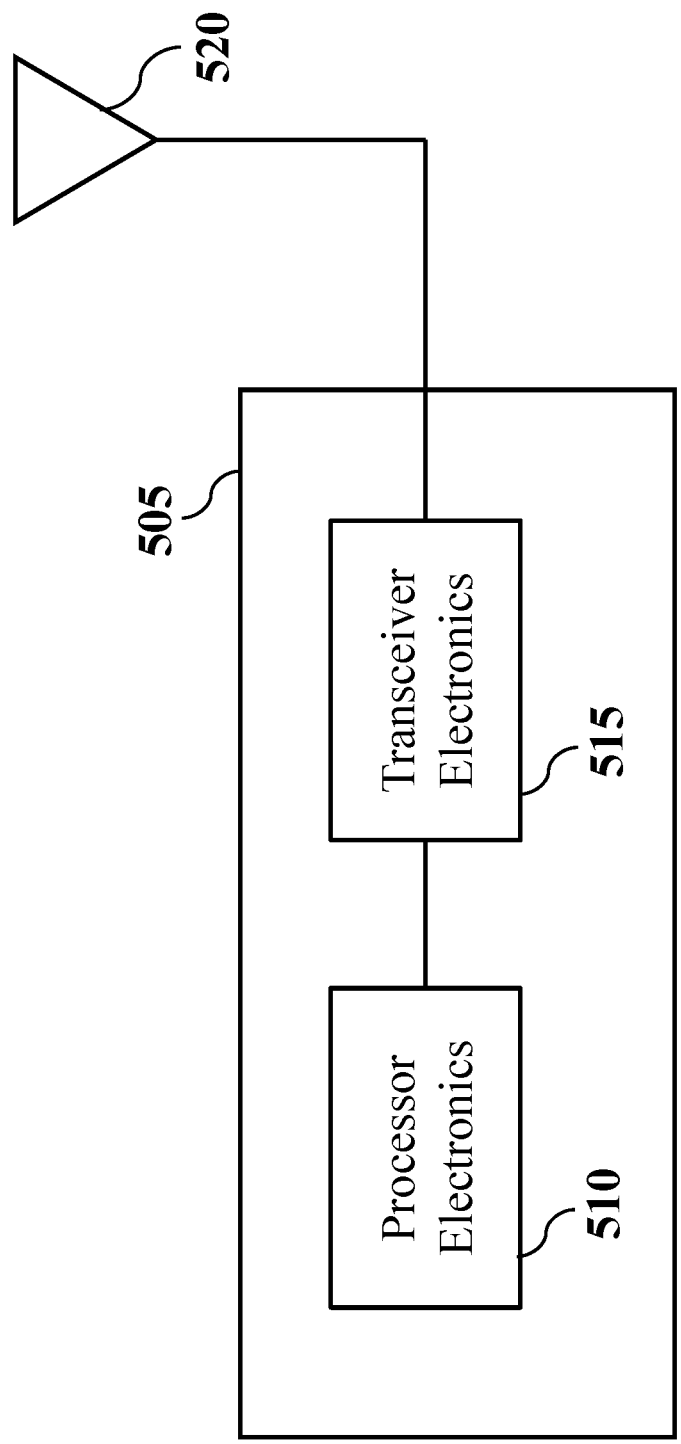
FIG. 5 is a block diagram representation of a portion of a radio station, in accordance with some embodiments of the presently disclosed technology.

FIG. 5 is a block diagram representation of a portion of a radio station, in accordance with some embodiments of the presently disclosed technology. A radio station 505, such as a base station or a wireless device (or UE), can include processor electronics 510 such as a microprocessor that implements one or more of the techniques presented in this document. The radio station 505 can include transceiver electronics 515 to send and/or receive wireless signals over one or more communication interfaces such as antenna(s) 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505.

The term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method carried out on a wireless communication apparatus, comprising:
  receiving a control signaling packet;
  determining, based on a bit map in the control signaling packet, whether one or more information elements are present in the control signaling packet,
    wherein each of the one or more information elements corresponds to a configuration parameter of a set of configuration parameters, and
    wherein the set of configuration parameters includes at least one of a modulation and coding scheme, a transmission block size, a redundancy version, and a hybrid automatic repeat request (HARQ) process identification (PID);
  upon determining an information element of the one or more information elements is absent in the control signaling packet, using a predetermined value for the configuration parameter corresponding to the absent information element, wherein the predetermined value is determined by a communication node; and
  upon determining an information element of the one or more information elements is present in the control signaling packet, using a predefined value from a set of predefined values for the configuration parameter corresponding to the present information element.

2. The method of claim 1, wherein the predefined value is determined based on data in the corresponding present information element.

3. The method of claim 1, further comprising:
  upon determining a plurality of information elements is absent in the control signaling packet, using a predetermined value for a higher priority configuration parameter corresponding to a higher priority information element of the plurality of information elements; and
  determining a value of each configuration parameter corresponding to each of the rest of the plurality of information elements based on the predetermined value of the higher priority configuration parameter.

4. The method of claim 1, wherein the predetermined value for the configuration parameter corresponding to the absent information element is determined from a range of predetermined values.

5. The method of claim 1, further comprising:
  transmitting a data packet using the set of configuration parameters.

6. The method of claim 1, further comprising:
  receiving a periodic broadcast packet from the communication node; and
  updating the predetermined value for a configuration parameter specified in the periodic broadcast packet.

7. The method of claim 6, wherein the updated predetermined value is based on user equipment capabilities in a wireless environment.

8. The method of claim 1, wherein a size of the set of predefined values is based on at least a data rate.

9. A wireless communication method carried out on a communication node, comprising:
  determining whether each predetermined value for each configuration parameter of a set of configuration parameters supports a current transmission mode, wherein the set of configuration parameters includes at least one of a modulation and coding scheme, a transmission block size, a redundancy version, and a hybrid automatic repeat request (HARQ) process identification (PID);
  upon determining the current transmission mode is not supported:
    including at least one information element in a control signaling packet, and
    modifying a bit map in the control signaling packet; and
  transmitting the control signaling packet.

10. The method of claim 9, wherein an information element of the at least one information elements comprises data that corresponds to a predefined value from a set of predefined values, and wherein the predefined value comprises an alternate value for one configuration parameter of the set of configuration parameters.

11. The method of claim 10, further comprising:
  receiving a data packet, wherein a format of the data packet is based on the set of configuration parameters.

12. The method of claim 10, wherein a size of the set of predefined values is based on at least a data rate.

13. The method of claim 9, wherein at least one predetermined value is determined from a range of predetermined values, and upon determining the current transmission mode is not supported, the method further comprises:
  determining an updated predetermined value for the at least one predetermined value from the range of predetermined values; and
  transmitting a periodic broadcast packet comprising the updated predetermined value or an indication of the updated predetermined value.

14. The method of claim 13, wherein the updated predetermined value is determined based on user equipment capabilities in a wireless environment.

15. An apparatus for wireless communications, comprising:
  a processor configured to:
    receive a control signaling packet;
    determine, based on a bit map in the control signaling packet, whether one or more information elements are present in the control signaling packet,
      wherein each of the one or more information elements corresponds to a configuration parameter of a set of configuration parameters, and
      wherein the set of configuration parameters includes at least one of a modulation and coding scheme, a transmission block size, a redundancy version, and a hybrid automatic repeat request (HARQ) process identification (PID);
    upon determining an information element of the one or more information elements is absent in the control signaling packet, use a predetermined value for the configuration parameter corresponding to the absent information element, wherein the predetermined value is determined by a communication node; and upon determining an information element of the one or more information elements is present in the control signaling packet, use a predefined value from a set of predefined values for the configuration parameter corresponding to the present information element.

16. The apparatus of claim 15, wherein the predefined value is determined based on data in the corresponding present information element.

17. The apparatus of claim 15, wherein the processor is further configured to:
   upon determining a plurality of information elements is absent in the control signaling packet, use a predetermined value for a higher priority configuration parameter corresponding to a higher priority information element of the plurality of information elements; and
   determine a value of each configuration parameter corresponding to each of the rest of the plurality of information elements based on the predetermined value of the higher priority configuration parameter.

18. The apparatus of claim 15, wherein the processor is further configured to:
   receive a periodic broadcast packet from the communication node; and
   update the predetermined value for a configuration parameter specified in the periodic broadcast packet.

19. The apparatus of claim 18, wherein the updated predetermined value is based on user equipment capabilities in a wireless environment.

20. The apparatus of claim 15, wherein a size of the set of predefined values is based on at least a data rate.

* * * * *